United States Patent
Suzuki et al.

(10) Patent No.: US 10,459,176 B2
(45) Date of Patent: Oct. 29, 2019

(54) COMMUNICATION LIGHT DETECTION DEVICE

(71) Applicant: Hitachi Metals, Ltd., Tokyo (JP)

(72) Inventors: Kanako Suzuki, Tokyo (JP); Mikio Ohkoshi, Tokyo (JP); Yoshihiro Nakatani, Tokyo (JP); Wataru Ohnuki, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/182,204

(22) Filed: Nov. 6, 2018

(65) Prior Publication Data

US 2019/0137702 A1     May 9, 2019

(30) Foreign Application Priority Data

Nov. 7, 2017    (JP) ................................. 2017-214602
Mar. 1, 2018    (JP) ................................. 2018-036205

(51) Int. Cl.
    *G02B 6/42*          (2006.01)
    *H04B 10/079*      (2013.01)

(52) U.S. Cl.
    CPC ......... *G02B 6/4214* (2013.01); *G02B 6/4203* (2013.01); *G02B 6/4206* (2013.01); *G02B 6/4243* (2013.01); *H04B 10/0791* (2013.01)

(58) Field of Classification Search
    CPC .. G02B 6/4214; G02B 6/4203; G02B 6/4206; G02B 6/4243; H04B 10/0791
    See application file for complete search history.

(56) References Cited

U.S. PATENT DOCUMENTS

2018/0067262 A1*   3/2018   Larson ..................... C09J 11/04

FOREIGN PATENT DOCUMENTS

JP         2010186058 A   *   8/2010
JP         2017-111235 A      6/2017

\* cited by examiner

*Primary Examiner* — Chris H Chu
(74) *Attorney, Agent, or Firm* — McGinn IP Law Group, PLLC

(57) ABSTRACT

A communication light detection device includes a housing provided with plural first optical adapters and plural second optical adapters, and plural light detection portions provided in connection portions respectively for optically connecting together a first optical fiber provided in the housing and extended from the first optical adapters into the housing and a second optical fiber extended from the corresponding second optical adapters into the housing, to detect light transmitted via both the optical fibers. The light detection portions each include a light leak portion provided in the connection portions to allow light to partially leak, a light receiving element to detect the light leaked at the light leak portion, and a case including a recessed groove for accommodating the connection portions and not transmitting light. A circuit board is included with the light receiving elements mounted thereon together, and is provided to close openings of the recessed grooves together.

16 Claims, 14 Drawing Sheets

COMMUNICATION LIGHT DETECTION DEVICE

CROSS-REFERENCE TO RELATED APPLICATIONS

The present application is based on Japanese patent application No. 2017-214602 filed on Nov. 7, 2017 and Japanese patent application No. 2018-036205 filed on Mar. 1, 2018, the entire contents of which are incorporated herein by reference.

BACKGROUND OF THE INVENTION

1. Field of the Invention

The present invention relates to a communication light detection device.

2. Description of the Related Art

In an optical communication related equipment such as a data center, a communication light detection device is used to identify communication states of optical communication paths and the soundness (presence or absence of a break or the like) of optical fibers constituting the optical communication paths.

As the conventional communication light detection device, one using a communication light visualization adapter for extracting a part of communication light as leak light is known (for example, refer to JP-A-2017-111235). JP-A-2017-111235 discloses that a communication light visualization adapter includes a plurality of panels mounted in alignment and arranged at stepped positions shifted in plural stages.

SUMMARY OF THE INVENTION

In the optical communication related equipment such as a data center, it is desired to effectively utilize it in a limited space as the communication capacity increases. High-density mounting is also required for the communication light detection device used for the optical communication related equipment such as a data center.

In addition, even in the case of high-density mounting, it is desirable to suppress crosstalk of leakage light and suppress deterioration of detection accuracy.

It is an object of the present invention to provide a communication light detection device capable of high-density mounting.

It is a further object of the present invention to provide a communication light detection device capable of high density mounting and capable of suppressing crosstalk of leakage light.

According to an aspect of the present invention, for the purpose of solving the above-mentioned problems, there is provided a communication light detection device, comprising:

a housing provided with a plurality of first optical adapters and a plurality of second optical adapters; and a plurality of communication light detection portions provided in connection portions respectively for optically connecting together a first optical fiber provided in the housing and extended from the first optical adapters into the housing and a second optical fiber extended from the corresponding second optical adapters into the housing, to detect communication light transmitted via both the optical fibers, wherein each of the communication light detection portions includes a respective light leak portion provided in the connection portions to allow a part of the communication light to leak, a respective light receiving element to detect the leak light leaked at the light leak portion, and a respective case for the communication light detection portions including a recessed groove for accommodating the connection portions and not transmitting the leak light, wherein a circuit board is included with the plurality of the light receiving elements mounted thereon together, and is provided, thereby closing the openings of the recessed grooves of the plurality of the communication light detection portion cases together.

According to another aspect of the present invention, for the purpose of solving the above-described problems, there is provided a communication light detection device, comprising:

a housing provided with a plurality of first optical adapters and a plurality of second optical adapters; and a plurality of communication light detection portions provided in connection portions respectively for optically connecting together a first optical fiber provided in the housing and extended from the first optical adapters into the housing and a second optical fiber extended from the corresponding second optical adapters into the housing, to detect communication light transmitted via both the optical fibers, wherein each of the communication light detection portions includes a respective light leak portion provided in the connection portions to allow a part of the communication light to leak, a respective light receiving element to detect the leak light leaked at the light leak portion, and a respective case for the communication light detection portions disposed on a bottom wall of the housing and including a recessed groove for accommodating the connection portions and not transmitting the leak light, wherein a circuit board is included with the plurality of the light receiving elements mounted thereon together, and is provided, thereby closing the openings of the recessed grooves of the plurality of the communication light detection portion cases together, wherein an elastic sheet is provided between each of the communication light detection portion cases and the bottom wall of the housing or between each of the communication light detection portion cases and the circuit board, and when the circuit board is pressed toward a bottom wall side of the housing, the elastic sheet is elastically deformed by that pressing.

Points of the Invention

According to one aspect of the present invention, it is possible to provide the communication light detection device capable of high-density mounting.

According to another aspect of the present invention, it is possible to provide the communication light detection device capable of high density mounting and capable of suppressing crosstalk of leakage light.

DETAILED DESCRIPTION OF THE PREFERRED EMBODIMENTS

Embodiments

An embodiment of the present invention will be described below with reference to the accompanying drawings.

First Embodiment (Overall Configuration of Optical Fiber Monitoring System 10)

Figure 1:
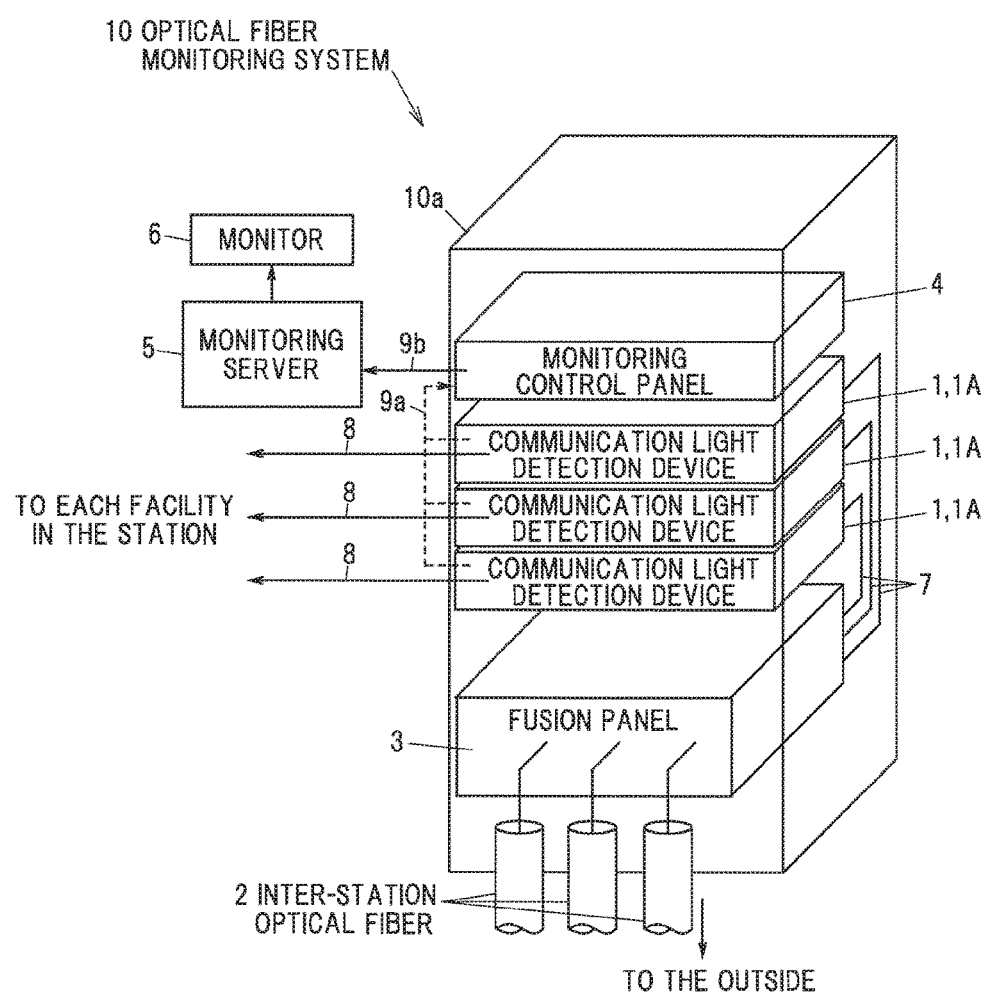
FIG. 1 is a schematic configuration diagram of an optical fiber monitoring system using a communication light detection device according to a first embodiment of the present invention.

FIG. 1 is a schematic configuration diagram of an optical fiber monitoring system 10 using a communication light detection device 1 according to this embodiment.

The optical fiber monitoring system 10 is provided in optical communication related equipment such as a data center and is for constantly monitoring the integrity of an inter-station optical fiber 2 connecting between optical communication related facilities (between stations). The number of inter-station optical fibers 2 connecting the stations is e.g. 1000. For the inter-station optical fiber 2, it is preferable to use a single mode optical fiber suitable for long distance transmission. The length of the inter-station optical fiber 2 is, for example, about 80 km at the maximum.

The optical fiber monitoring system 10 includes a fusion panel 3, a plurality (here, three) of communication light detection devices 1, a monitoring control panel 4, a monitoring server 5, and a monitor 6. The fusion panel 3, each communication light detection device 1, and the monitoring control panel 4 are attached to a rack 10a.

To the fusion panel 3 is optically connected one end of the inter-station optical fiber 2 by fusion bonding. Further, the fusion panel 3 is optically connected to each communication light detection device 1 via an inter-device optical wiring 7.

The communication light detection device 1 is for detecting the light intensity of the communication light transmitted through each inter-station optical fiber 2 (each channel). Here, the case of using three communication light detection devices 1 will be described, but the number of communication light detection devices 1 is not limited thereto. To each communication light detection device 1 is connected an intra-station optical wiring 8 extending to each facility in the stations. That is, one end of the inter-station optical fiber 2 is optically connected to each facility in the stations via the fusion panel 3, the inter-device optical wiring 7, each communication light detection device 1, and the intra-station optical wiring 8. In addition, each communication light detection device 1 is configured in such a manner as to be capable of transmitting data of light intensity of each detected channel to the monitoring control panel 4 via a communication cable 9a such as a LAN cable or the like.

The monitoring control panel 4 is for aggregating data on the light intensity detected at each communication light detection device 1 and transmitting the aggregated data on the light intensity to the monitoring server 5 via a communication cable 9b such as a LAN cable. Note that the monitoring control panel 4 is not limited to the illustrated example, but may be omitted, and the light intensity data may be transmitted directly from each communication light detecting device 1 to the monitoring server 5.

On the basis of the received light intensity data, the monitoring server 5 displays on the monitor 6 the presence or absence of communication in each inter-station optical fiber 2, the light intensity of the communication light, and the like.

(Explanation of Communication Light Detection Device 1)

Figure 2:
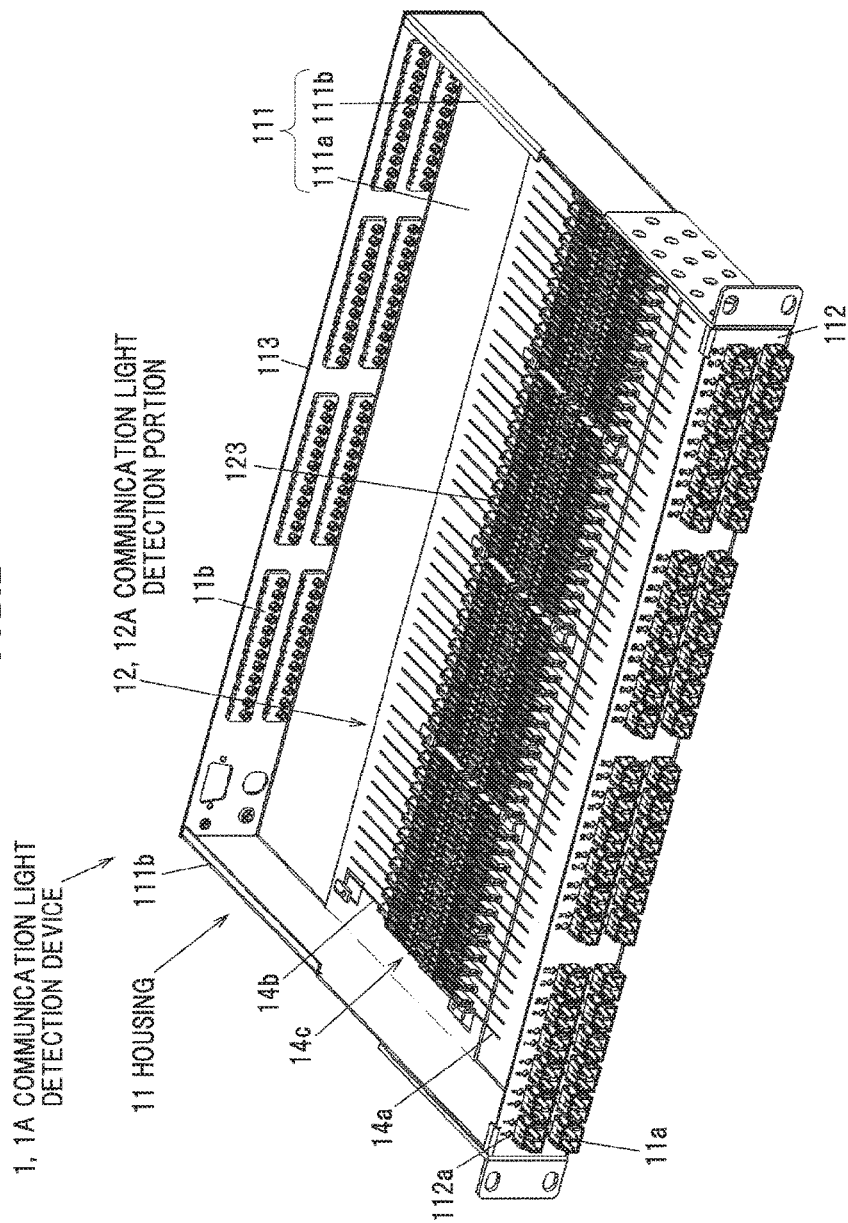
FIG. 2 is a perspective view showing a schematic configuration of the communication light detection device.
Figure 3:
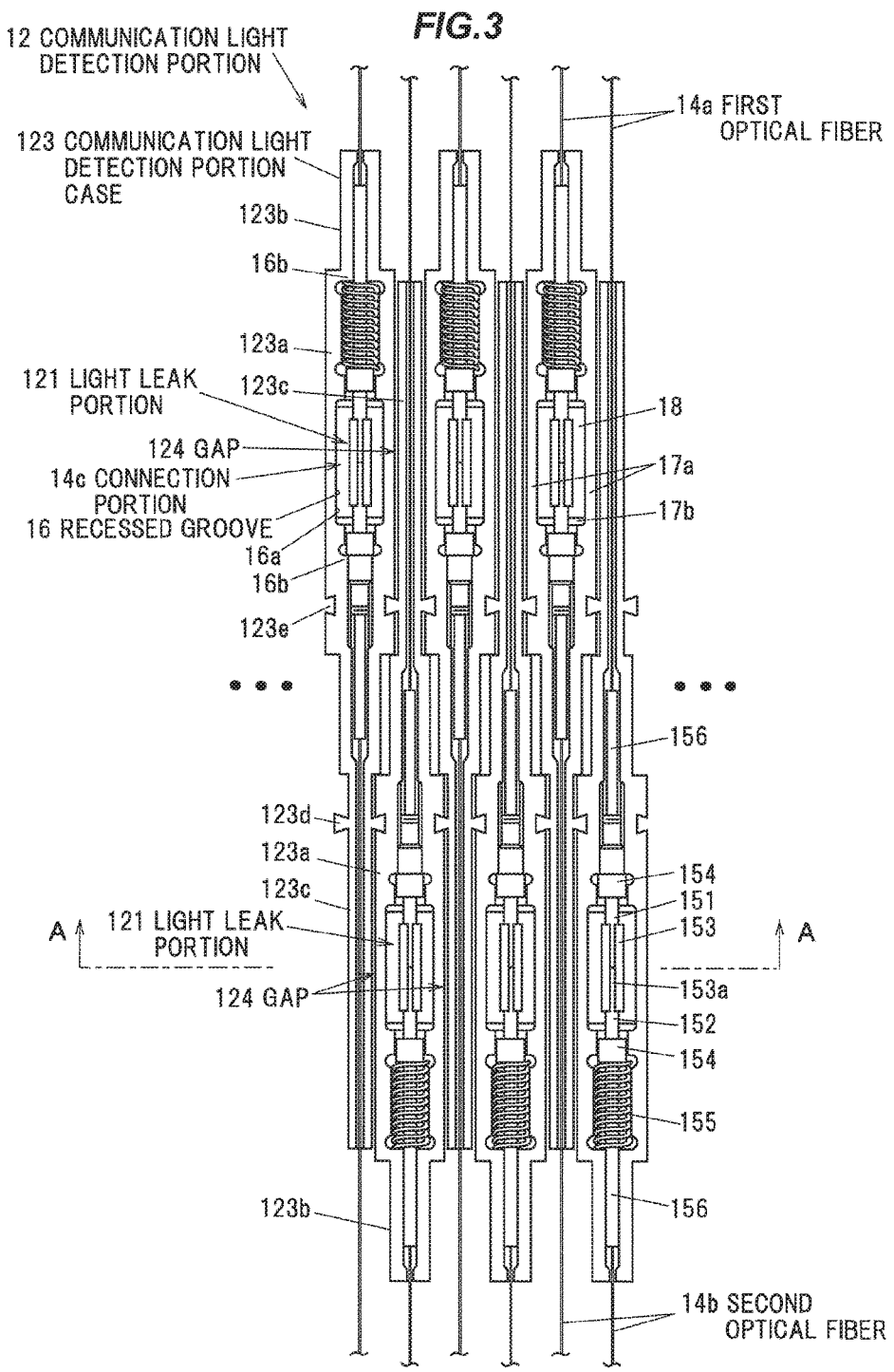
FIG. 3 is a plan view of a communication light detection portion.
Figure 4:
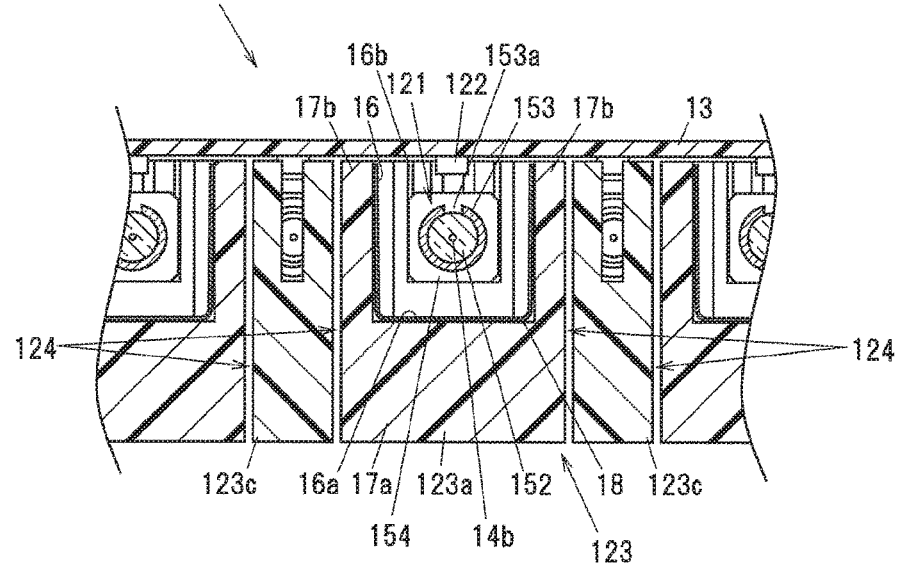
FIG. 4 is a cross-sectional view taken along line A-A of FIG. 3.
Figure 5:
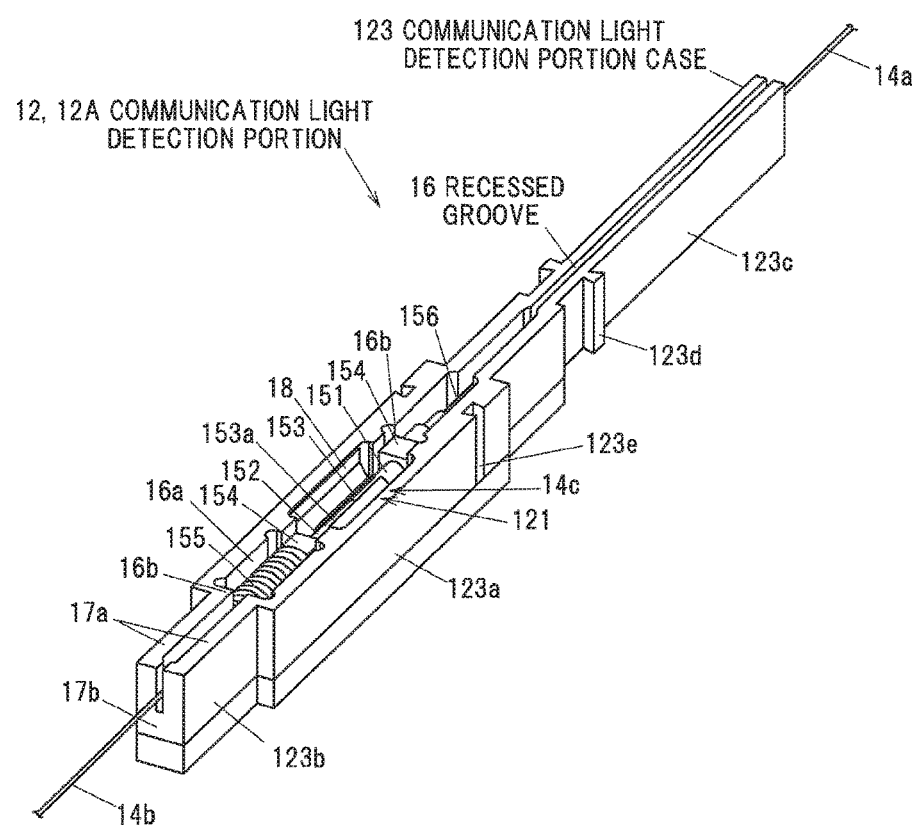
FIG. 5 is a perspective view of the communication light detection portion.

FIG. 2 is a perspective view showing a schematic configuration of the communication light detection device 1. FIG. 3 is a plan view of a communication light detection portion 12, and FIG. 4 is a cross-sectional view taken along line A-A thereof. FIG. 5 is a perspective view of the communication light detection portion 12. In FIGS. 2, 3, and 5, a circuit board 13 and a light receiving element 122 are omitted.

The communication light detection device 1 includes a housing 11, a plurality of communication light detection portions 12, and a circuit board 13. The housing 11 is formed in a substantially rectangular parallelepiped shape and includes a main body portion 111 integrally having a bottom wall Ma and a pair of side walls 111b extending upward from both sides of the bottom wall and opening forward and rearward and upward, a front panel 112 for closing an opening on the front side of the main body part 111, a rear panel 113 for closing an opening on the rear side of the main body 111, and an upper panel (not shown) for covering an upper opening of the main body 111. Hereinafter, the opposing direction (the left-right direction in FIG. 2) of the pair of side walls 111b is referred to as the width direction, the opposing direction (the direction from the left front to the right back in FIG. 2) of the front panel 112 and the rear panel 113 is referred to as the length direction, and the opposing direction (the vertical direction in FIG. 2) of the bottom wall Ma and the upper panel is referred to as the height direction.

The front panel 112 of the housing 11 is provided with a plurality of first optical adapters 11a to which is connected an optical connector (not shown) provided at an end of the intra-station optical wiring 8. As the optical connector, for example, an SC connector, an LC connector, or the like can be used. To the first optical adapter 11a is connected a first optical fiber 14a extended from the first optical adapter 11a into the housing 11. Note that for the sake of simplification of the drawing, a connecting portion between the first optical adapter 11a and the first optical fiber 14a is omitted in FIG. 2. A display window 112a for displaying the presence or absence of communication is provided above each of the first optical adapters 11a, respectively, in the front panel 112.

The rear panel 113 of the housing 11 is provided with a plurality of second optical adapters 11b to which is connected an optical plug (not shown) provided at an end of the inter-device optical wiring 7 extended from the fusion panel 3. To the second optical adapter 11b is connected a second optical fiber 14b extended from the second optical adapter 11b into the housing 11. Note that for the sake of simplicity, in FIG. 2, a connecting portion between the second optical adapter 11b and the second optical fiber 14b is omitted. The surplus lengths of both the optical fibers 14a and 14b are preferably bundled by pluralities, wound in a circular shape and accommodated in the housing 11. Both a single mode optical fiber and a multimode optical fiber can be used for both the optical fibers 14a and 14b.

The front panel 112 and the rear panel 113 of the housing 11 are detachable with respect to the main body portion 111. As a result, it is possible to replace the front panel 112 and the rear panel 113 with appropriate optical adapters 11a and 11b attached thereto according to the usage situation without changing the internal configuration of the housing 11. In other words, by merely replacing the front panel 112 and the rear panel 113, it is possible to deal with various types of connector systems, and versatility is improved.

The communication light detection portion 12 is for detecting the light intensity of the communication light transmitted via the two optical fibers 14a and 14b, that is, the light intensity of the communication light transmitted through the inter-station optical fiber 2. In the present embodiment, the communication light detection portion 12 is provided in the housing 11. The communication light detection portions 12 are provided in connecting portions 14c respectively for optically connecting together the first optical fiber 14a extended from the first optical adapter 11a into the housing 11 and the second optical fiber 14b extended from the corresponding second optical adapter 11b into the housing 11.

In the present embodiment, each of the communication light detection portions 12 includes a light leak portion 121 provided in the connection portion 14c to allow a part of the communication light to leak, a light receiving device 122 to detect the leak light leaked at the light leak portion 121, and a communication light detection portion case 123 having a recessed groove 16 for accommodating the connection portion 14c and not transmitting the leak light. Details of each part will be described later.

On the circuit board 13, a plurality of light receiving elements 122 are mounted together. In the present embodiment, the light receiving elements 122 of all the communication light detection portions 12 arranged in the housing 11 are mounted on the common circuit board 13. The circuit board 13 is provided, thereby closing the openings of the recessed grooves 16 of the plurality of (here, all disposed in the housing 11) the communication light detection portion cases 123 together.

Although not shown, the circuit board 13 is mounted with an amplifier circuit for converting a current signal from the light receiving element 122 into a voltage signal and amplifying and outputting the voltage signal, an A/D converter for converting an output from the amplifier circuit to a digital signal, a computing portion for computing the light intensity of the communication light transmitted through both the optical fibers 14a and 14b based on the digital signal inputted from the A/D converter, and a communication control portion for transmitting the calculation result at the computing portion to the monitoring control panel 4, and the like. Also, although not shown, a light emitting diode for indicating the presence or absence of communication is provided at a front panel 112 side end portion of the circuit board 13 to face the display window 112a. On the circuit board 13, a display circuit for displaying the presence/absence of communication is mounted on the basis of the light intensity of the communication light by controlling the presence or absence of lighting of the light emitting diode, controlling the lighting color of the light emitting diode, or the like. Note that the specific circuit configuration and the like of the circuit board 13 are not particularly limited.

As described above, in the communication light detection device 1 according to the present embodiment, the plugs connected to the optical adapters 11a and 11b do not have the function of detecting the communication light, but the communication light detection mechanisms (the communication light detection portions 12) are aggregated and provided in the housing 11. When the plug (the adapter) connected to the first connector 11a is provided with the function of detecting the communication light, there is a limit to the size reduction of the plug (the adapter), and there is a limit in high-density mounting as well. By aggregating and providing the communication light detection mechanisms (communication light detection portions 12) in the housing 11 as in the present embodiment, the optical adapters 11a and 11b can be disposed more densely, and it is possible to achieve further high-density mounting compared with the conventional technique which provides the plug (the adapter) with the function of detecting the communication light.

(Explanation of Light Leak Portion 121)

Figure 6:
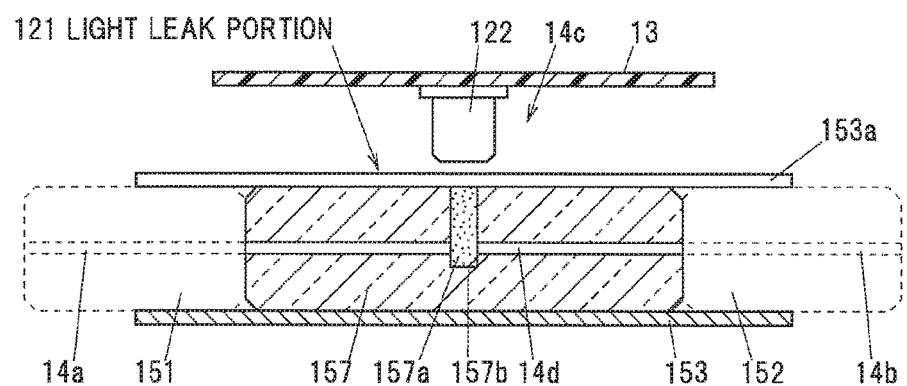
FIG. 6 is an explanatory view for explaining a light leak portion.

FIG. 6 is an explanatory view for explaining the light leak portion 121. The light leak portion 121 is for leaking a part of the communication light transmitted via both the optical fibers 14a and 14b. In the present embodiment, an end portion of the first optical fiber 14a is accommodated in a first ferrule 151. The end face of the first optical fiber 14a is polished together with the tip face of the first ferrule 151. The end portion of the second optical fiber 14b is accommodated in the second ferrule 152. The end face of the second optical fiber 14b is polished together with the tip face of the second ferrule 152.

Between the two ferrules 151 and 152, a joining body 157, which is a ferrule having an optical fiber 14d built therein, is disposed. The joining body 157 is inserted into a split sleeve 153. The first ferrule 151 is inserted into the split sleeve 153 from one end of the split sleeve 153, and the end face of the first optical fiber 14a and the end face of the optical fiber 14d are butt-connected to each other. Similarly, the second ferrule 152 is inserted into the split sleeve 153 from the other end of the split sleeve 153, and the end face of the second optical fiber 14b and the end face of the optical fiber 14d are butt-connected to each other. The split sleeve 153 is formed in a C-shaped cross section by providing a slit 153a along the axial direction in a hollow cylindrical body and is disposed with the slit 153a facing upward (the light receiving element 122 side). Both the ferrules 151 and 152 and the joining body 157 are made of zirconia ceramics or the like which transmits and scatters the communication light. In the present embodiment, the split sleeve 153 is also made of a member such as zirconia ceramics or metal. The light receiving element 122 is made of a PD (Photo Diode).

The joining body 157 has a light detecting groove 157b formed to traverse the optical fiber 14d from the outer surface of the joining body 68. The light detection groove 157c is formed by processing means such as dicing with a blade or etching. The light receiving element 122 is arranged to face the light detecting groove 157b.

Although the inside of the light detection groove 157b may be a vacuum, it is preferable that the light detection groove 157b is filled with a resin 157a having a refractive index lower than that of the core of the optical fiber 14d. The resin 157a used may be in the form of a liquid or a thermosetting resin or an ultraviolet (UV) curable resin or an adhesive having a refractive index lower than the refractive index of the core of the optical fiber 14d after being cured. Also, it is more preferable that the resin 157a filled in the light detection groove 157b has a refractive index lower than that of the core of the optical fiber 14d and a refractive index lower than that of the clad of the optical fiber 14d.

In the light leak portion 121, a part of the communication light transmitted via both the optical fibers 14a and 14b leaks at the light detection groove 157b. The leak light, which is a part of the leaked communication light, is received at the light receiving element 122 arranged above the light leak portion 121.

Since the light intensity of the leak light received at the light receiving element 122 depends on the light intensity of the communication light, the light intensity of the communication light can be obtained by calculation based on the light intensity detected at the light receiving element 122. It is to be noted that the configuration described in FIG. 6 is merely one example, and the configuration for leaking a part of the communication light is not limited to the illustrated one.

Flange portions 154 projecting outward in the radial direction are provided at the base end portions of the ferrules 151 and 152, respectively. The flange portions 154 are for interfering with the inner wall of the communication light detection portion case 123 to position the light leak portion 121. The flange portions 154 are formed in a rectangular shape when viewed from the axial direction of the ferrules 151 and 152 and are prevented from rotating due to interference with the inner wall (later-described side wall 17b) of the communication light detecting portion case 123.

Also, a coil spring 155 as a biasing member is provided between the flange portion 154 on the side of the first ferrule 151 and the inner wall of the communication light detecting portion case 123. By pressing the flange portion 154 and the first ferrule 151 against the second ferrule 152 side by this coil spring 155, a sufficient connection load is ensured at the abutting connection portions of both the ferrules 151 and 152 and the joining body 157, that is, at the abutting connection portions of the first optical fiber 14a and the optical fiber 14d, and the second optical fiber 14b and the optical fiber 14d.

Protective tubes 156 for protecting the optical fibers 14a and 14b are provided around the optical fibers 14a and 14b respectively extended from the flange portions 154 so that the optical fibers 14a and 14b are not broken at the extended portions. The protective tubes 156 are made of, for example, a thermoplastic polyester elastomer, and are bonded and fixed to the flange portions 154 by an adhesive (not shown).

(Explanation of Case 123 for Communication Light Detection Portion)

The communication light detection portion case 123 is made of a material that does not transmit communication light (leakage light), and is made of, for example, a resin such as an ABS (acrylonitrile-butadiene-styrene copolymer), PBT (polybutylene terephthalate), PC (polycarbonate), PEI (polyether imide) or the like, with carbon or titanium added thereto.

In the housing 11, the same number of communication light detection portion cases 123 as that of the optical fibers 14a and 14b are accommodated and fixed on the bottom wall 111a. Each communication light detection portion case 123 is arranged so that the optical axis of the communication light (not including the leak light) at the connection portion 14c is arranged along the length direction and is aligned and arranged in the direction perpendicular to the optical axis of the communication light at the connection portion 14c, that is, in the width direction.

The communication light detection portion case 123 integrally includes a main body portion 123a in which the connection portion 14c is housed, a first extended portion 123b extended from the main body portion 123a in one direction in the length direction (the direction along the optical axis of the communication light at the connection portion 14c) and in which either one of the first optical fiber 14a and the second optical fiber 14b is accommodated, and a second extended portion 123c extending from the main body portion 123a in the other direction in the length direction and accommodating the other one of the first optical fiber 14a and the second optical fiber 14b. The main body portion 123a, the first extended portion 123b, and the second extended portion 123c are made of the same material and integrally formed by injection molding or the like.

The main body portion 123a, the first extended portion 123b, and the second extended portion 123c are formed equal in height and in a rod shape (rectangular tube shape) having a rectangular cross section perpendicular to the length direction. Both the extended portions 123b and 123c are formed narrower in width than the main body 123a. In addition, the length of the first extended portion 123b along the length direction (extending length from the main body portion 123a) is shorter than that of the second extended portion 123c.

The communication light detection portion case 123 is configured by sequentially arranging the first extended portion 123b, the main body portion 123a, and the second extended portion 123c in a straight line along the length direction. The recessed groove 16 is formed in a substantially linear shape to penetrate the first extended portion 123b, the main body portion 123a, and the second extended portion 123c in the length direction. In other words, the recessed groove 16 is formed across the main body portion 123a and the extended portions 123b and 123c. One end of the recessed groove 16 is open at the end face of the first extended portion 123b opposite to the main body portion 123a and from this opening, one of the first optical fiber 14a and the second optical fiber 14b is extended to the outside of the communication light detecting portion case 123. Also, the other end of the recessed groove 16 is open at the end face of the second extended portion 123b on the side opposite to the main body portion 123a and from this opening, the other of the first optical fiber 14a and the second optical fiber 14b is extended to the outside of the communication light detection portion case 123.

The recessed groove 16 formed in the main body portion 123a has a connecting portion accommodating portion 16a for accommodating both the ferrules 151 and 152, both the flange portions 154, the split sleeve 153, and the coil spring 155. The recessed groove 16 extended from the connecting portion accommodating portion 16a is formed narrower in width than the connecting portion accommodating portion 16a and a step 16b is formed at the end portion in the length direction of the connecting portion accommodating portion 16a. One end of the coil spring 155 abuts the step 16b on the side of the first extended portion 123b and regulates the movement of the coil spring 155 toward the first extended portion 123b side. The other end of the coil spring 155 is in contact with the end face of the one flange portion 154, and the coil spring 155 biases the flange portion 154 toward the second extended portion 123c side. The step 16b on the side of the second extended portion 123c is in contact with the end face of the other flange portion 154 so that the movement of the flange portion 154 toward the second extending portion 123c side is restricted by the biasing force of the coil spring 155.

Hereinafter, in the communication light detecting portion case 123, the portion constituting the bottom surface of the recessed groove 16 is referred to as a bottom wall 17a, and the wall sandwiching the recessed groove 16 in the width direction is referred to as a sidewall 17b. The thickness of the side wall 17b around the connecting portion 14c and the thickness of the side wall 17b of the second extended portion 123c may be any thickness as long as the communication light (leakage light) does not pass therethrough, for example, on the order of 1 mm.

On the inner peripheral surface of the connecting portion accommodating portion 16a of the recessed groove 16, a reflecting material 18 for reflecting the leak light is provided. As the reflecting material 18, a metal plate made of an iron-based material such as SUS or aluminum or the like can be used. It is preferable that the reflecting material 18 is subjected to mirror finishing or metal plating such as Ni, Ag, Au, or the like. In the present embodiment, the reflecting material 18 is provided to be substantially U-shaped in a cross-sectional view to follow the inner peripheral surface of the connecting portion accommodating portion 16a. By providing the reflecting material 18, the light intensity of the leak light received at the light receiving element 122 can be increased, and the sensitivity enhancement can be ensured.

(Explanation of Arrangement of Communication Light Detection Portion Case 123)

In the communication light detection device 1, the communication light detection portion cases 123 adjacent to each other are arranged in such a manner as to be spaced from each other in the alignment direction (the width direction). In the present embodiment, the communication light detection portion cases 123 adjacent to each other are in such a manner as to be spaced from each other with a gap (that is, an air layer) 124 interposed therebetween.

Figure 7A:
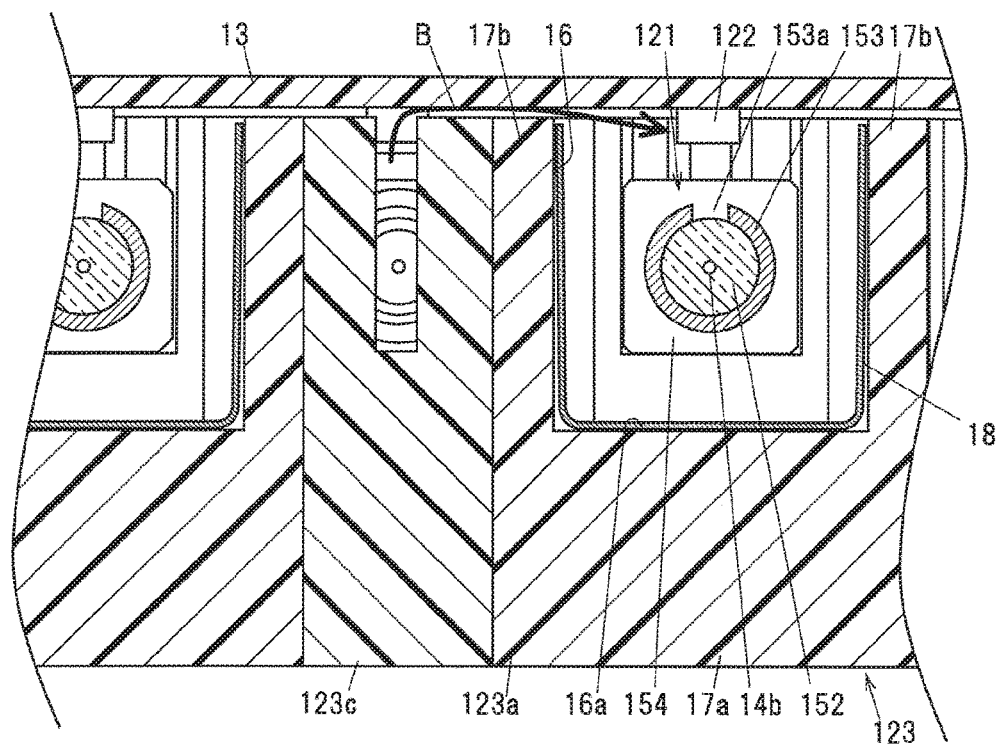
FIG. 7A is a diagram for explaining occurrence of crosstalk in a conventional communication light detection device.

As indicted by the thick arrow B in FIG. 7A, when the adjacent communication light detection portion cases 123 are in close contact, leakage light leaking out laterally from the slight gap between the communication light detection portion cases 123 and the circuit board 13 may reach the adjacent communication light detecting portions 12. As a result, there is a possibility that the light receiving elements 122 of the adjacent communication light detection portions 12 receive light (that is, crosstalk occurs), and the measurement accuracy of the light intensity of the communication light decreases.

Figure 7B:
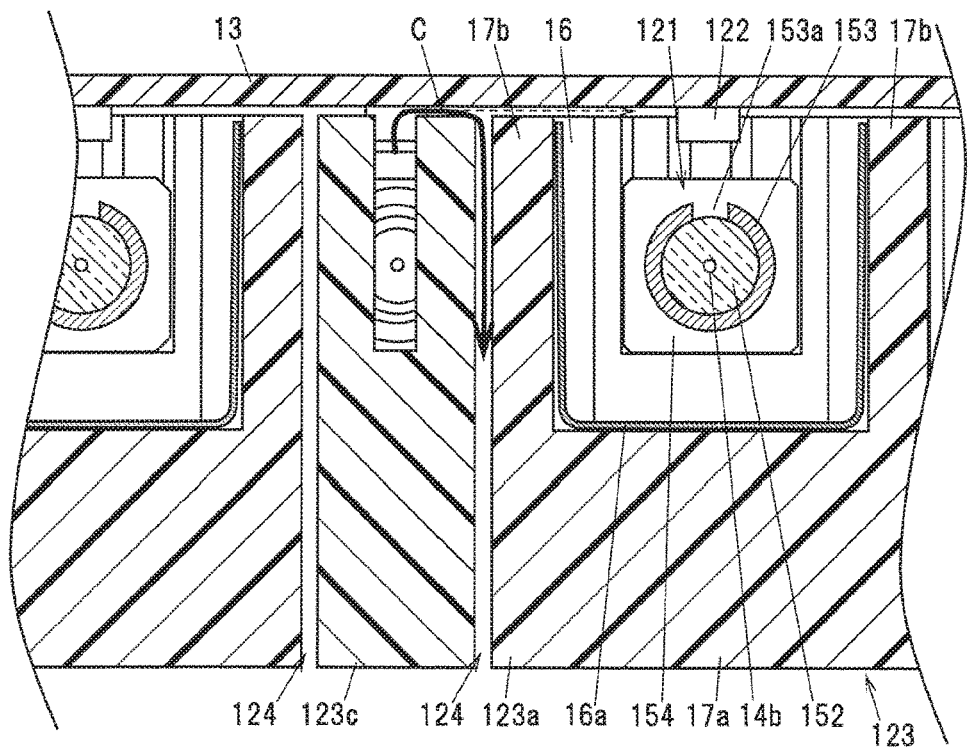
FIG. 7B is a diagram for explaining that occurrence of crosstalk is suppressed in the present invention.

On the other hand, as shown in FIG. 7B, when the communication light detection portion cases 123 adjacent to each other are spaced and the gap 124 is formed, as indicted by a thick arrow C in the drawing, this gap 124 serves as a light path, and the leakage light is guided downward, so that the leaked light is less likely to reach the light receiving elements 122 of the adjacent communication light detection portions 12 (that is, the occurrence of crosstalk is suppressed).

The width of the gap 124, that is, the spacing along the width direction of the adjacent communication light detection portion cases 123 are preferably 0.1 mm or more. If the width of the gap 124 is less than 0.1 mm, the effect of releasing the leak light to the gap 124 is reduced, and the leak light easily reaches the light receiving elements 122 of the adjacent communication light detection portions 12.

Since the gap 124 is for forming a light path, a translucent member that transmits the communication light (the leakage light) may be arranged in the gap 124. In other words, the communication light detection portion cases 123 adjacent to each other may be spaced apart via the translucent member translucent to the communication light. By configuring this translucent member with a member having a refractive index higher than that of air, it is difficult for the leak light to reach the light receiving elements 122 of the adjacent communication light detection portions 12 due to the light confining effect.

Note that it is not necessary that the whole of the communication light detection portion cases 123 adjacent to each other are spaced apart from each other with the gap 124 therebetween, but in the vicinity of the light leak portions 121 (the light receiving elements 122), the adjacent communication light detection portion cases 123 may be spaced with the gap 124 therebetween. Further, even in the vicinity of the light leak portion 121, the gap 124 may be formed between the upper parts of the communication light detection portion cases 123 adjacent to each other, and the upper parts of the communication light detection portion cases 123 may be in contact with each other.

Further, in the present embodiment, the communication light detection portions 12 adjacent to each other are arranged so that the positions of the light leak portions 121 are shifted in the length direction which is the direction parallel to the optical axis of the communication light at the connection portion 14c. Here, the light leakage part 121 of each communication light detection portion 12 is alternately arranged at two positions in the length direction, the first length direction position and the second length direction position so that the length direction positions of the light leak parts 121 are different in the adjacent communication light detection portions 12. That is, each communication light detection portion 12 is aligned and arranged in the width direction so that the light leak portions 121 are arranged in a zigzag manner in a top view.

By arranging the communication light detection portions 12 in a zigzag manner, the leak light leaking at the light leak portion 121 is less likely to affect the adjacent light leak portion 121. Further, by arranging the communication light detection portions 12 in a zigzag manner, it becomes easier to mount the communication light detection portions 12 at a higher density in the width direction.

In the present embodiment, the communication light detection portion cases 123 adjacent to each other are arranged in opposite directions in the length direction. In other words, in the communication light detection portions 12 adjacent to each other, the orientations of the communication light detection portion cases 123 in the length direction are opposite to each other. In the adjacent communication light detecting portion cases 123, the main body 123a of one communication light detecting portion case 123 is adjacent to the second extended portion 123c of the other communication light detecting portion case 123, and the main body 123a of the other communication light detecting portion case 123 is adjacent to the second extended portion 123c of one communication light detection portion case 123.

In the case where the light leak portions 121 are arranged in a zigzag manner, the optical fibers 14a and 14b are adjacent to the light leak portions 121. As a result of studies by the present inventors, it has been found that the leak light formed at the light leak portion 121 passes through the optical fibers 14a and 14b and reaches a position relatively distant from the light leak portion 121 in the length direction. Therefore, in order to suppress the influence of the leakage light leaking through the optical fibers 14a and 14b, it is desirable that at least the second extended portion 123c is extended longer than the length direction positions of the light leak portions 121 of the adjacent communication light detecting portions 12.

Also, as described above, it is preferable that the communication light detection portion cases 123 adjacent to each other are spaced apart with the gap 124 therebetween in the vicinity of the light leak portion 121 (the light receiving element 122), and it is preferable that at least at the same length direction position as the light leak portion 121, the side wall 17b of the second extended portion 123c, the gap 124, and the side wall 17b of the main body portion 123a are sequentially arranged between the optical fibers 14a and 14b and the light leak portion 121.

An experiment was conducted with the width of the side wall 17b set at 1 mm and the width of the gap 124 set at 0.1 mm to identify the presence or absence of the occurrence of crosstalk. As a result, it was confirmed that no crosstalk occurred even when communication light of 20 dBm or more is transmitted to both the optical fibers 14a and 14b. That is, by forming the gap 124 between the communication light detection portion cases 123 adjacent to each other and arranging the leak light portions 121 in a zigzag manner, even when the communication light having a relatively high light intensity is transmitted, it is possible to suppress the occurrence of crosstalk and it is possible to achieve both high density mounting and suppression of crosstalk.

Furthermore, in the present embodiment, it is possible to lock the communication light detection portion cases 123 adjacent to each other to each other so that the plurality of communication light detection portion cases 123 can be integrally assembled. Specifically, a locking protrusion 123d is formed on both side surfaces (surfaces on the outer side of both the side walls 17b) of the second extended portion 123c of the communication light detecting portion case 123, and a locking groove 123e for locking the locking protrusion 123d is formed on both side surfaces of the main body portion 123a. The adjacent communication light detection portion cases 123 are fixed to each other by locking one of the locking projections 123d to an other of the locking grooves 123e and an other one of the locking projections 123d to one of the locking grooves 123e, respectively.

The locking protrusions 123d are formed to be wider in width outward (toward its tip), and the locking grooves 123e are formed to become narrower in width toward its opening. In the present embodiment, by sliding the other communication light detection portion case 123 in the height direction with respect to one communication light detection portion case 123, the locking protrusions 123d are slid and inserted into the locking grooves 123e, so the two communication light detection portion cases 123 are locked together.

The locking protrusions 123d and the locking grooves 123e are formed so that the side surfaces of the adjacent communication light detecting portion cases 123 are spaced from each other with the gap 124 therebetween when the adjacent communication light detecting portion cases 123 are fixed to each other. The locking protrusion 123d is formed to have a protruding length slightly longer than the depth of the locking groove 123e, and the gap 124 having a predetermined width is formed only by locking the locking protrusion 123d in the locking groove 123e and fixing the adjacent communication light detecting portion cases 123 to each other.

(Modified Example of Reflective Material 18)

Figure 8A:
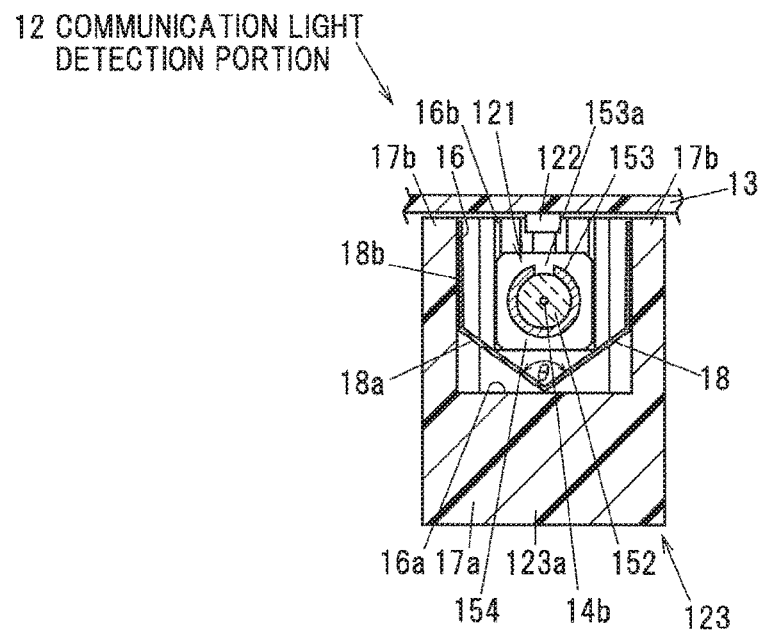
FIG. 8A is a cross-sectional view showing one modification to the communication light detection portion.

In the present embodiment, the case where the reflecting material 18 is provided to have a substantially U shape in a cross-sectional view has been described, but as shown in FIG. 8A, the lower portion of the reflecting material 18 may be formed in a V shape. In the example of FIG. 8A, the reflecting member 18 integrally has an inclined portion 18a formed into a V shape having a narrower opening width downward and a holding portion 18b extending substantially upward from both ends of the inclined portion 18a. The reflecting material 18 is formed by bending a single metal plate. Since the reflecting member 18 has the inclined portion 18a, the leak light is more likely to be reflected toward the light receiving element 122 side, and the detection sensitivity of the light intensity of the communication light is further improved. The interior angle (opening angle) θ in the inclined portion 18a formed in a V shape may appropriately be set according to the position of the light receiving element 122 and the like and may be set at 45° or more and 160° or less, more preferably 60° or more and 90° or less.

Figure 8B:
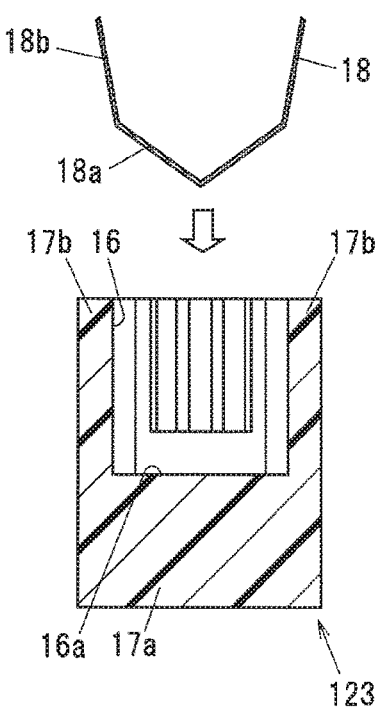
FIG. 8B is an explanatory view for explaining attachment of a reflecting material.

As shown in FIG. 8B, the reflecting member 18 may be formed so that its end (upper end) on the opening side is slightly open in the width direction and may be pushed into the recessed groove 16 (into the connecting portion accommodating portion 16a). As a result, the holding portion 18b is pressed toward the side wall 17b by the restoring force of the reflecting material 18, so that the reflecting material 18 is held within the recessed groove 16 (within the connecting portion accommodating portion 16a), and the reflecting material 18 is less likely to slip off from the communication light detection portion case 123. It is desirable that the holding portion 18b is formed along the side wall 17b as much as possible when the reflecting member 18 is inserted into the recessed groove 16 and that the contact area between the holding portion 18b and the side wall 17b is made as large as possible.

Figure 9:
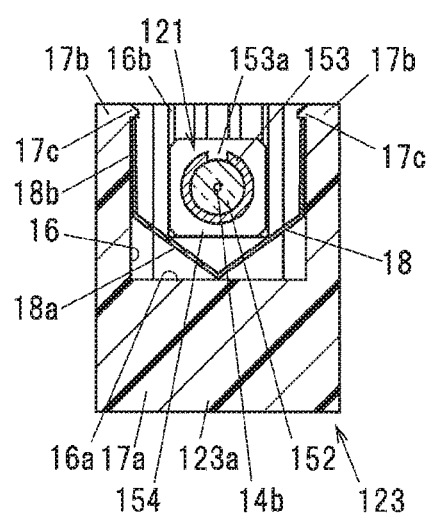
FIG. 9 is a cross-sectional view showing one modified example of the communication light detection portion.

Further, as shown in FIG. 9, a retaining protrusion 17c that protrudes inward in the width direction and regulates upward movement of the reflecting material 18 may be provided at the upper end portions of both the side walls 17b, to prevent the slipping off of the reflecting member 18 from the communication light detection part case 123. It should be noted that the retaining protrusion 17c may be formed on only one of the two side walls 17c.

(Modification of Second Extension Portion 123c)

In the present embodiment, the case where the second extending portion 123c is made of the same material as the main body portion 123a and integrally formed with the main body portion 123a has been described, but the second extended portion 123c may be formed separately from the main body 123a.

Figure 10:
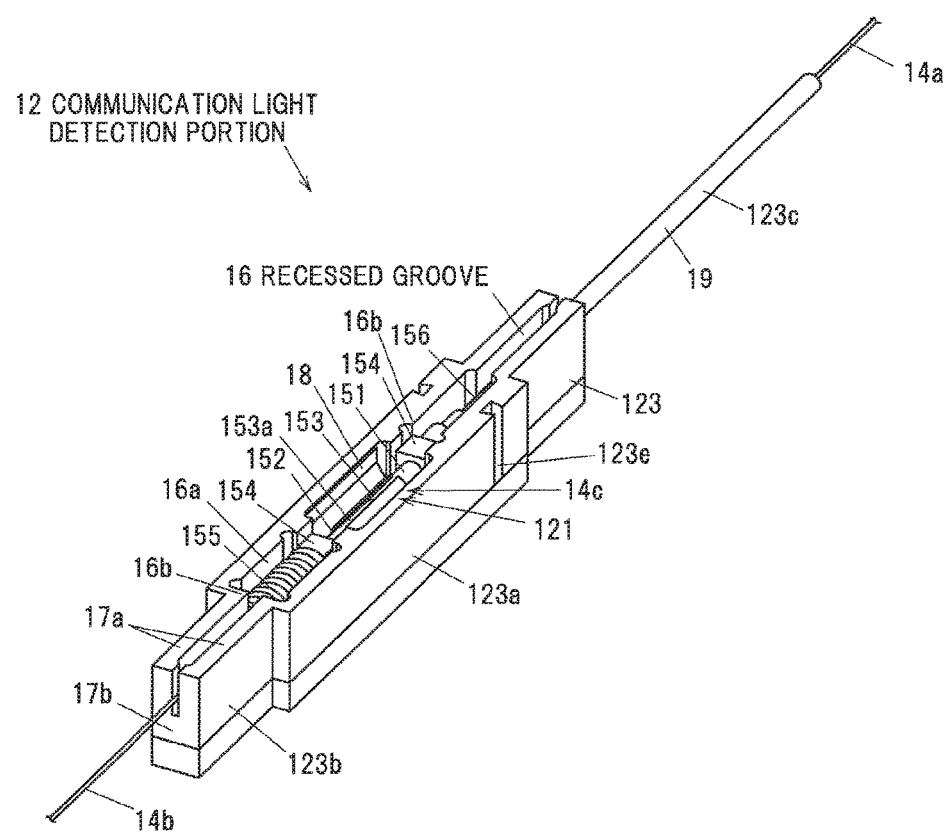
FIG. 10 is a perspective view showing one modification to the communication light detection portion.

For example, as shown in FIG. 10, the second extended portion 123c is composed of a tube 19 which covers an outer circumference of the first optical fiber 14a or the second optical fiber 14b extended from the main body portion 123a and that does not transmit the leak light. An end portion of the tube 19 is fixed to the main body portion 123a with an adhesive or the like. In this case, when the tube 19 is used as the second extended portion 123c, it is preferable to cover it with a lid member so that no leakage light leaks at the connecting portion between the main body portion 123a and the tube 19.

(Description of Shielding Wall)

Figure 11A:
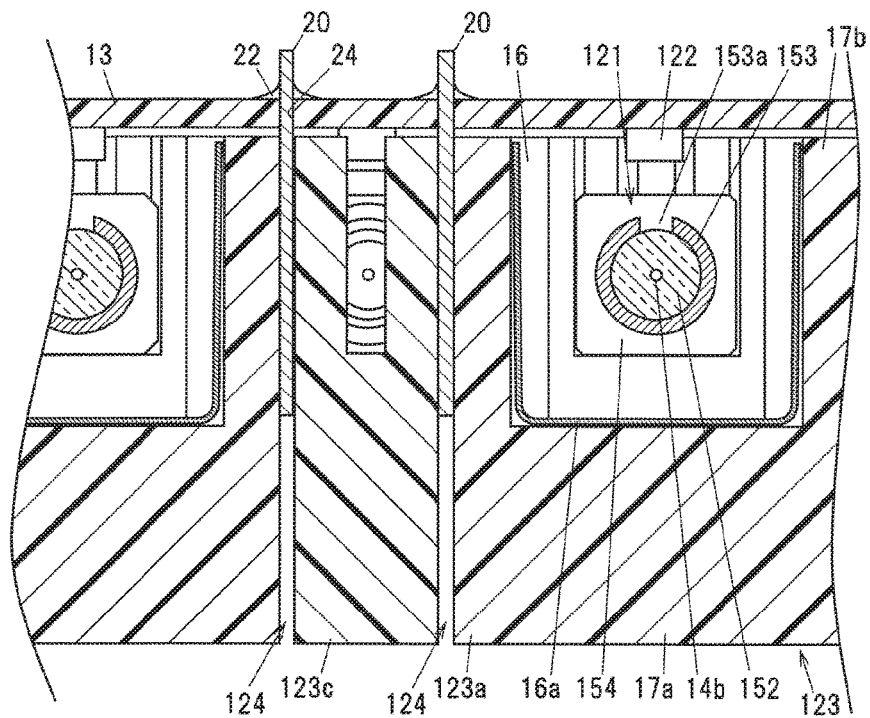
FIGS. 11A and 11B are cross-sectional views showing one modification to the communication light detection portion.

Although not mentioned in the present embodiment, as shown in FIG. 11A, the communication light detection device 1 is provided with a light shielding wall 20 provided on the circuit board 13 for shielding the leakage light, thereby suppressing the leakage of the leakage light to the adjacent communication light detection portions 12. The light shielding wall 20 is made of a member that does not transmit the communication light (the leak light).

When the light shielding wall 20 is attached to the lower surface of the circuit board 13, the leakage light may leak from a slight gap between the light shielding wall 20 and the circuit board 13, so the light shielding wall 20 may be inserted through a through hole 24 formed to penetrate the circuit board 13 and provided to penetrate the circuit board 13. Note that the upper end portion of the light shielding wall 20 may not protrude upward relative to the circuit board 13 but may be accommodated in the recessed groove provided on the lower surface of the circuit board 13, for example. The lower end portion of the light shielding wall 20 is extended downward relative to the upper surface (the upper end of the side wall 17b) of the communication light detection portion case 123. In the example of FIG. 11A, the circuit board 13 and the light shielding wall 20 are fixed with a solder 22 on the upper surface side of the circuit board 13, but the fixing method of the light shielding wall 20 is not particularly limited.

Figure 11B:
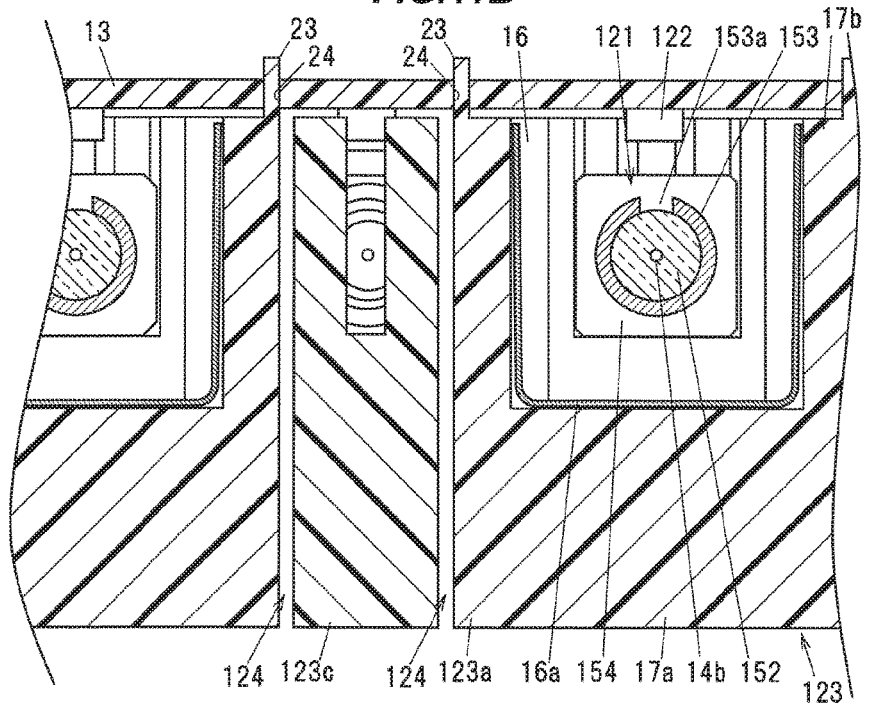

In addition, as shown in FIG. 11B, a light shielding wall 23 may be provided on the communication light detection portion case 123 side. In the example of FIG. 11B, the light shielding wall 23 is integrally formed with the side wall 17b to extend upward from the upper end portion of the side wall 17b of the main body 123a. However, the present invention is not limited to this, but the light shielding wall 23 may be provided on the side wall 17b of the second extended portion 123c. If the light shielding wall 23 is merely brought into contact with the lower surface of the circuit board 13, light leaks from a slight gap, so it is desirable that the upper end of the light shielding wall 23 is extended upward relative to the lower surface of the circuit board 13, that is, it is desirable that the light shielding wall 23 penetrates through the circuit board 13, or that the upper end of the light shielding wall 23 is received in the recessed groove formed on the lower surface of the circuit board 13. In the example of FIG. 11B, the circuit board 13 is formed with a through hole 24 that penetrates the circuit board 13, and the light shielding wall 23 is inserted through the through hole 24.

By inserting the light shielding wall 20 between the communication light detection portion cases 123 adjacent to each other or by inserting the light shielding wall 23 into the through hole 24 (or the recessed groove), it is also possible to hold the relative positional relationship of the circuit board 13 relative to the communication light detection portion case 123. That is, by having the light shielding walls 20 and 23, not only the leakage of the leakage light can be suppressed, but also the positional misalignment in the width direction and the length direction of the circuit board 13 with respect to the communication light detection portion case 123 can be suppressed. Furthermore, by further providing a locking structure for locking the light shielding walls 20 and 23, it is also possible to suppress the positional misalignment between the communication light detection portion case 123 and the circuit board 13 in the height direction. As a result, it is possible to suppress the detection error due to the positional misalignment of the light receiving element 122, thereby improving the detection accuracy.

(Operation and Advantageous Effects of the First Embodiment)

As described above, the communication light detection device 1 according to the first embodiment includes the plurality of communication light detection portions 12 provided in the housing 11, and each communication light detection portion 12 includes the respective light leak portion 121 to allow a part of the communication light to leak, the respective light receiving device 122 to detect the leak light leaked at the light leak portion 121, and the respective communication light detection portion case 123 having the recessed groove 16 for accommodating the connection portion 14c and not transmitting the leak light, wherein the circuit board 13 is included with the plurality of the light receiving elements 122 mounted thereon together, and is provided, thereby closing the openings of the recessed grooves 16 of the plurality of the communication light detection portion cases 123 together.

When the plug (the adapter) connected to the first connector 11a is provided with the communication light detecting function, there is a limitation in reducing the size of the plug (the adapter), and it becomes difficult to mount the connectors 11a and 11b at high density, therefore, the high-density mounting is limited. In the present embodiment, since the plurality of communication light detection portions 12 are aggregated in the housing 11, it is possible to easily mount the connectors 11a and 11b at high density, and it is possible to realize further high-density mounting, as compared with the case where the plug is provided with the function of detecting the communication light.

Second Embodiment (Overall Configuration of Optical Fiber Monitoring System 10)

The schematic configuration of the optical fiber monitoring system 10 using a communication light detection device 1A according to the present embodiment is the same as the schematic configuration of the optical fiber monitoring device 10 according to the first embodiment shown in FIG. 1 except for the configuration further including an elastic sheet 21, so the detailed description thereof will be omitted.

(Explanation of Communication Light Detection Device 1)

The schematic configuration of the communication light detection device 1A according to the present embodiment is also the same as the schematic configuration of the communication light detection device 1 according to the first embodiment shown in FIG. 2 except for the configuration further including the elastic sheet 21, therefore, the detailed explanation will be omitted.

Figure 12:
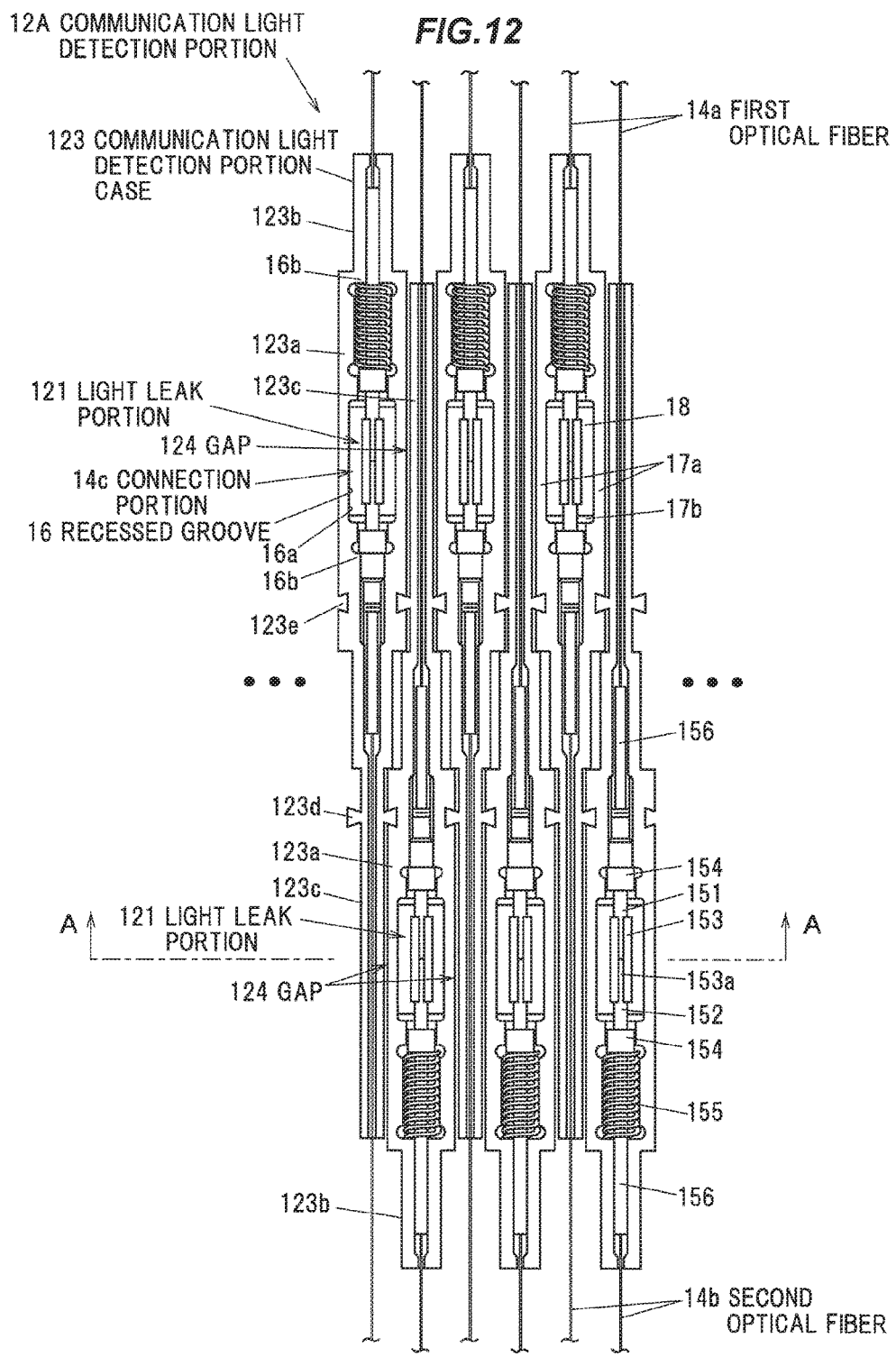
FIG. 12 is a plan view of a communication light detection portion of a communication light detection device according to a second embodiment of the present invention.
Figure 13A:
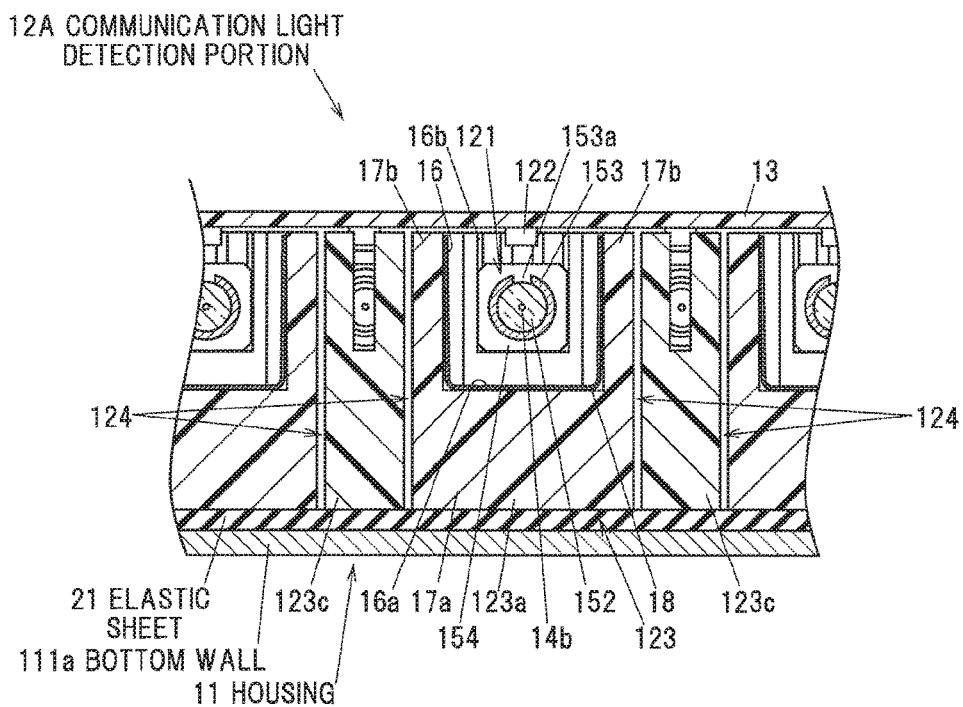
FIG. 13A is a cross-sectional view taken along the line A-A of FIG. 12.
Figure 13B:
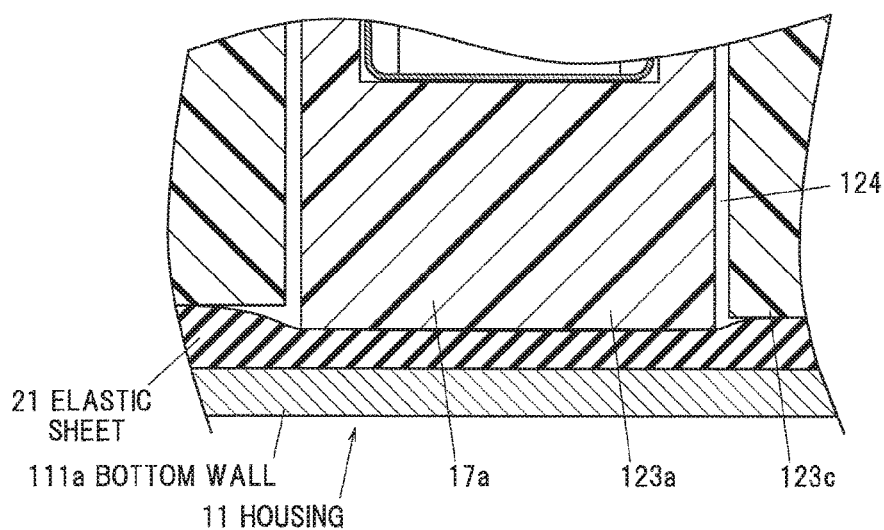
FIG. 13B is an enlarged view of an essential portion thereof.

FIG. 12 is a plan view of a communication light detection portion 12A, FIG. 13A is a sectional view taken along line A-A thereof, and FIG. 13B is an enlarged view of an essential portion of FIG. 13A.

The communication light detection device 1A includes a housing 11, a plurality of communication light detection portions 12, a circuit board 13, and an elastic sheet 21. The rest of the configuration is the same as in the first embodiment.

Also in the present embodiment, the communication light detection portion 12A is provided in the housing 11, and except for the configuration of the elastic sheet 21, the configuration of each portion is the same as those of the communication light detection portion 12 of the first embodiment.

(Description of Elastic Sheet 21)

As shown in FIG. 13A, the communication light detection device 1A according to the present embodiment further includes an elastic sheet 21 that is provided between each communication light detection portion case 123 and the bottom wall 111a of the housing 11, and that is elastically deformed by the pressing force when the circuit board 13 is pressed toward the bottom wall 111a side of the housing 11.

In the present embodiment, the circuit board 13 is screwed and fixed to a fixing piece 114 (see FIG. 2) provided to protrude upward on the bottom wall 111a. In addition, when the circuit board 13 is screwed and fixed to the fixing piece 114, the circuit board 13 is fixed with each communication light detecting portion case 123 pressed toward the bottom wall 111a side.

In this case, if there is a variation in the height of the communication light detection portion case 123 due to manufacturing tolerance or the like, a large gap is formed between the circuit board 13 and the communication light detection portion case 123, and leakage light leaking out laterally from the gap may reach the adjacent communication light detecting portions 12. As a result, there is a possibility that the light receiving elements 122 of the adjacent communication light detection portions 12 receive light (that is, crosstalk occurs), and the measurement accuracy of the light intensity of the communication light decreases.

In the present embodiment, since the elastic sheet 21 is provided, the deformation of the elastic sheet 21 absorbs the variations in the heights of the communication light detection portion cases 123, so it is difficult for the large gap to be formed between the circuit board 13 and the cases 123 for the communication light detection portions. As a result, the crosstalk of the leak light can be suppressed, and the deterioration of the detection accuracy can be suppressed.

As the elastic sheet 21, it is preferable to use a black one which absorbs the leak light. Further, as the elastic sheet 21, it is desirable to use a material having adhesiveness on its surface. This is because the elastic sheet 21 has adhesiveness, so that the positional misalignment of the communication light detection portion cases 123 can be suppressed. More specifically, the material of the elastic sheet 21 is not particularly limited, but a resin sheet made of a resin material may be used, but a rubber sheet made of a rubber material is preferable. As the rubber material suitable for the elastic sheet 21, for example, ethylene propylene rubber (EPM), ethylene propylene diene rubber (EPDM), chloroprene rubber (CR), butadiene rubber (BR) and the like may be listed. Also, it is more desirable that the rubber material used for the elastic sheet 21 is foamed rubber. For the foamed rubber, foamed EPDM is preferable.

If the thickness of the elastic sheet 21 is as too thin as less than 0.2 mm, there is a possibility that the effect of absorbing the variation in the height of the communication light detecting portion cases 123 may not be sufficiently obtained, so it is desirable to set the thickness of the elastic sheet 21 at 0.2 mm or more. In addition, when the thickness of the elastic sheet 21 exceeds 5.0 mm, the effect of absorbing the variation in the height of the communication light detection portion cases 123 does not improve any more. Further, if the elastic sheet 21 is too thick, the cost may increase and the weight of the communication light detection device 1 may increase. Therefore, the thickness of the elastic sheet 21 is preferably 5.0 mm or less. In other words, the thickness of the elastic sheet 21 is desirably 0.2 mm or more and 5.0 mm or less, more desirably 2.0 mm or more and 3.0 mm or less.

(Explanation of Arrangement of Communication Light Detection Portion Case 123)

Similarly to the first embodiment shown in FIGS. 7A and 7B, in the communication light detection device 1A, the communication light detection portion cases 123 adjacent to each other are arranged apart from each other in the alignment direction (the width direction).

Even when the elastic sheet 21 is used, a slight gap may be formed between the communication light detection portion case 123 and the circuit board 13 due to the warp of the circuit board 31 and the like. As indicted by the thick arrow B in FIG. 7A, if the adjacent communication light detection portion cases 123 are in close contact, leakage light leaking out laterally from the slight gap between the communication light detection portion cases 123 and the circuit board 13 may reach the adjacent communication light detecting portions 12A. As a result, there is a possibility that the light receiving elements 122 of the adjacent communication light detection portions 12A receive light (that is, crosstalk occurs), and the measurement accuracy of the light intensity of the communication light lowers.

In contrast, as shown in FIG. 7B, when the communication light detection portion cases 123 adjacent to each other are spaced and the gap 124 is formed, as indicted by a thick arrow C in the drawing, this gap 124 serves as a light path, and the leakage light is guided downward, so that the leaked light is less likely to reach the light receiving elements 122 of the adjacent communication light detection portions 12A (that is, the occurrence of crosstalk is suppressed).

The other configurations, operations and effects are the same as those in the first embodiment.

(Modification)

Figure 14A:
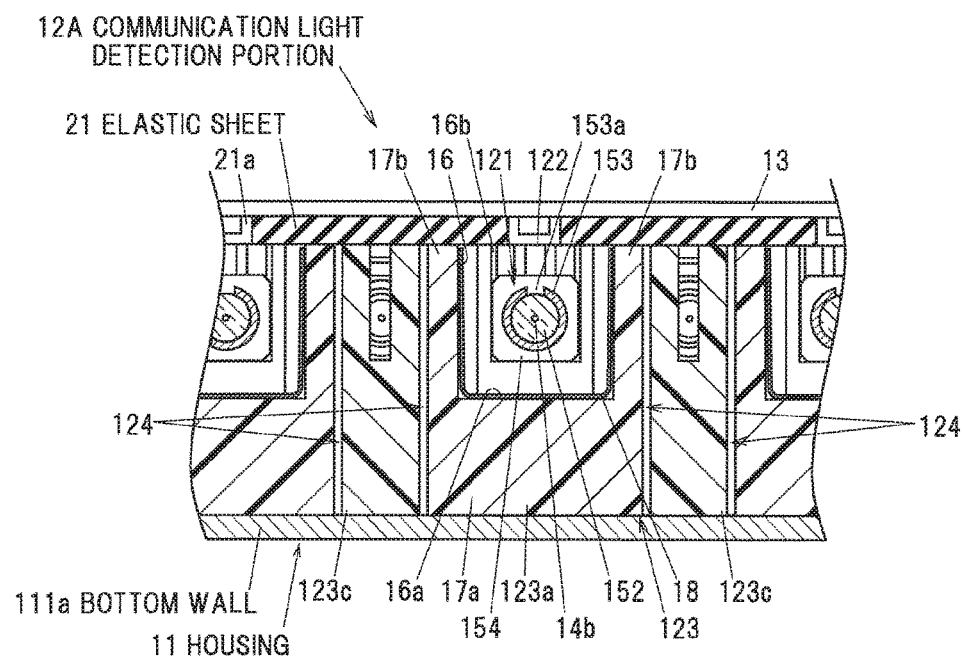
FIG. 14A is a cross-sectional view of a communication light detection portion in a communication light detection device according to one modification to the present invention.
Figure 14B:
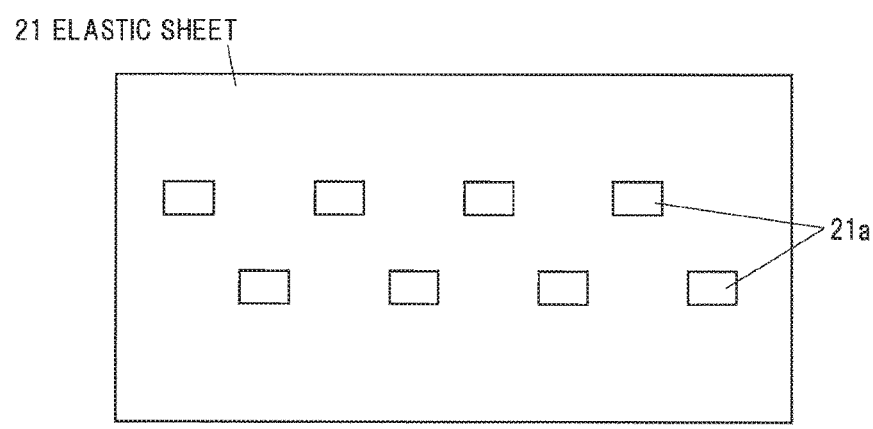
FIG. 14B is a plan view of an elastic sheet.

In the present embodiment, the case where the elastic sheet 21 is provided between the communication light detection portion case 123 and the bottom wall 111a of the housing 11 has been described, but, as shown in FIGS. 14A and 14B, the elastic sheet 21 may be provided between each communication light detection portion case 123 and the circuit board 13. In this case, it is necessary that the elastic sheet 21 is formed with a plurality of light receiving element holes 21a penetrating the elastic sheet 21 in the thickness direction to avoid the light receiving elements 122.

(Operation and Advantageous Effects of the Second Embodiment)

As described above, the communication light detection device 1A according to the second embodiment has the plurality of communication light detection portions 12A provided in the housing 11, as in the first embodiment, and each communication light detection portion 12A includes the respective light leak portion 121 to allow a part of the communication light to leak, the respective light receiving device 122 to detect the leak light leaked at the light leak portion 121, and the respective communication light detection portion case 123 having the recessed groove 16 for accommodating the connection portion 14c and not transmitting the leak light, wherein the circuit board 13 is included with the plurality of the light receiving elements 122 mounted thereon together, and is provided, thereby closing the openings of the recessed grooves 16 of the plurality of the communication light detection portion cases 123 together.

According to the above configuration, the same effect as that of the first embodiment can be achieved.

Further, the communication light detection device 1A according to the present embodiment includes the elastic sheet 21 that is provided between each communication light detection portion case 123 and the bottom wall 111a of the housing 11 or between each communication light detection portion case 123 and the circuit board 13 and that is elastically deformed by the pressing force when the circuit board 13 is pressed toward the bottom wall 111a side of the housing 11.

By providing the elastic sheet 21, it is possible to absorb the variations in the heights of the communication light detection portion cases 123 due to the influence of the manufacturing tolerance and suppress the crosstalk of the leak light. That is, according to the present embodiment, it is possible to realize the communication light detection device capable of high density mounting and capable of suppressing the crosstalk of the leakage light.

Summary of the Embodiments

Next, the technical ideas grasped from the above-described embodiments will be described with the aid of reference numerals and the like in the embodiments. It should be noted, however, that each of the reference numerals and the like in the following description does not limit the constituent elements in the claims to the members and the like specifically shown in the embodiments.

[1] A communication light detection device (1), comprising: a housing (11) provided with a plurality of first optical adapters (11a) and a plurality of second optical adapters (11b); and a plurality of communication light detection portions (12) provided in connection portions (14c) respectively for optically connecting together a first optical fiber (14a) provided in the housing (11) and extended from the first optical adapters (11a) into the housing (11) and a second optical fiber (14b) extended from the corresponding second optical adapters (11b) into the housing (11), to detect communication light transmitted via both the optical fibers (14a, 14b), wherein each of the communication light detection portions (12) includes a respective light leak portion (121) provided in the connection portions (14c) to allow a part of the communication light to leak, a respective light receiving element (122) to detect the leak light leaked at the light leak portion (121), and a respective case (123) for the communication light detection portions (12) including a recessed groove (16) for accommodating the connection portions (14c) and not transmitting the leak light, wherein a circuit board (13) is included with the plurality of the light receiving elements (122) mounted thereon together, and is provided, thereby closing the openings of the recessed grooves (16) of the plurality of the communication light detection portion cases (123) together.

[2] The communication light detection device (1) according to [1] above, wherein each of the communication light detection portion cases (123) is aligned in a direction perpendicular to an optical axis of the communication light at the connection portions (14c), wherein the communication light detection portion cases (123) adjacent to each other are spaced apart from each other in an alignment direction thereof.

[3] The communication light detection device (1) according to [2] above, wherein the communication light detection portion cases (123) adjacent to each other are spaced apart from each other with a gap (124) therebetween.

[4] The communication light detection device (1) according to [2] or [3] above, wherein the communication light detection portion cases (123) adjacent to each other are spaced apart from each other with a translucent member translucent to the communication light therebetween.

[5] The communication light detection device (1) according to any one of [1] to [4] above, wherein the communication light detection portions (12) adjacent to each other are arranged so that the positions of the light leak portions (121) are shifted in a length direction parallel to the optical axis of the communication light at the connection portions (14c), wherein the cases (123) for the communication light detection portions (12) include a main body portion (123a) in which the connection portions (14c) are accommodated, and an extension portion (123c) extended in the length direction from the main body portion (123a) for accommodating either one of the first optical fiber (14a) and the second optical fiber (14b), wherein the extended portions (123c) are formed narrower in width than the main body portions (123a), and are extended longer than length direction positions of the light leak portions (121) of the communication light detection portions (12) adjacent to each other.

[6] The communication light detection device (1) according to [5] above, wherein the light leak portion (121) of each of the communication light detection portions (12) is alternately arranged at a first length direction position and a second length direction position so that the lengthwise positions of the light leak portions (121) are different in the communication light detection portions (12) adjacent to each other.

[7] The communication light detection device (1) according to [5] or [6] above, wherein the extended portions (123c) are formed with a locking projection (123d) on both side surfaces thereof, while the main body portions (123a) are formed with a locking groove (123e) on both side surfaces thereof to lock the locking projections (123d), wherein the communication light detection portion cases (123) adjacent to each other are arranged in opposite directions in the length direction, and are fixed to each other by locking one of the locking projections (123d) to an other of the locking grooves (123e) and an other one of the locking projections (123d) to one of the locking grooves (123e), respectively.

[8] The communication light detection device (1) according to [7] above, wherein the main body portions (123a) and the extended portions (123c) are integrally formed, wherein the recessed grooves (16) are formed across the main body portions (123a) and the extended portions (123c), wherein the locking projections (123d) and the locking grooves (123e) are formed so that when the communication light detection portion cases (123) adjacent to each other are fixed to each other, the side surfaces of the communication light detection portion cases (123) adjacent to each other are spaced from each other with a gap (124) therebetween.

[9] The communication light detection device (1) according to [5] or [6] above, wherein the extended portions (123c) are formed of a tube (19) that covers an outer circumference of the first optical fiber (14a) or the second optical fiber (14b) extended from the main body portions (123a) and that does not transmit the leak light.

[10] The communication light detection device (1) according to any one of [1] to [9] above, wherein the recessed grooves (16) are provided with a reflective material (18) for reflecting the leaked light on an inner peripheral surface thereof.

[11] The communication light detection device (1) according to any one of [1] to [10] above, including a light shielding wall (20, 23) that is provided on the circuit board (13) or the cases (123) for the communication light detection portions (12) and that shields the leak light, thereby suppressing the leakage of the leak light to the communication light detection portions (12) adjacent to each other.

[12] A communication light detection device (1A), comprising: a housing (11) provided with a plurality of first optical adapters (11a) and a plurality of second optical adapters (11b); and a plurality of communication light detection portions (12A) provided in connection portions (14c) respectively for optically connecting together a first optical fiber (14a) provided in the housing (11) and extended from the first optical adapters (11a) into the housing (11) and a second optical fiber (14b) extended from the corresponding second optical adapters (11b) into the housing (11), to detect communication light transmitted via both the optical fibers (14a, 14b), wherein each of the communication light detection portions (12A) includes a respective light leak portion (121) provided in the connection portions (14c) to allow a part of the communication light to leak, a respective light receiving element (122) to detect the leak light leaked at the light leak portion (121), and a respective case (123) for the communication light detection portions (12A) disposed on a bottom wall (111a) of the housing (11) and including a recessed groove (16) for accommodating the connection portions (14c) and not transmitting the leak light, wherein a circuit board (13) is included with the plurality of the light receiving elements (122) mounted thereon together, and is provided, thereby closing the openings of the recessed grooves (16) of the plurality of the communication light detection portion cases (123) together, wherein an elastic sheet (21) is provided between each of the communication light detection portion cases (123) and the bottom wall (111a) of the housing (11) or between each of the communication light detection portion cases (123) and the circuit board (13), and when the circuit board (13) is pressed toward a bottom wall (111a) side of the housing (11), the elastic sheet (21) is elastically deformed by that pressing.

[13] The communication light detection device (1A) according to [12] above, wherein the elastic sheet (21) is a rubber sheet made of a rubber material.

[14] The communication light detection device (1A) according to [13] above, wherein the thickness of the elastic sheet (21) is 0.2 mm or more and 1.0 mm or less.

[15] The communication light detection device (1A) according to any one of [12] to [14] above, wherein the elastic sheet (21) is provided between each of the communication light detection portion cases (123) and the circuit board (13), wherein the elastic sheet (21) is formed with a plurality of light receiving element holes (21a) penetrating the elastic sheet (21) in a thickness direction to avoid the light receiving elements (122).

[16] The communication light detection device (1A) according to any one of [12] to [15] above, wherein the communication light detection portion cases (123) are aligned in a direction perpendicular to an optical axis of the communication light at the connection portions (14c), wherein the communication light detection portion cases (123) adjacent to each other are spaced apart from each other in an alignment direction thereof.

Although the embodiment of the present invention has been described above, the embodiment described above does not limit the invention according to the claims. It should also be noted that not all combinations of the features described in the embodiments are indispensable to the means for solving the problem of the invention.

The present invention can be appropriately modified and carried out within the scope not deviating from the spirit thereof.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A communication light detection device, comprising:
    a housing provided with a plurality of first optical adapters and a plurality of second optical adapters; and
    a plurality of communication light detection portions provided in connection portions respectively for optically connecting together a first optical fiber provided in the housing and extended from the first optical adapters into the housing and a second optical fiber extended from the corresponding second optical adapters into the housing, to detect communication light transmitted via both the optical fibers,
    wherein each of the communication light detection portions includes a respective light leak portion provided in the connection portions to allow a part of the communication light to leak, a respective light receiving element to detect the leak light leaked at the light leak portion, and a respective case for the communication light detection portions including a recessed groove for accommodating the connection portions and not transmitting the leak light,
    wherein a circuit board is included with the plurality of the light receiving elements mounted thereon together, and is provided, thereby closing the openings of the recessed grooves of the plurality of the communication light detection portion cases together.

2. The communication light detection device according to claim 1, wherein each of the communication light detection portion cases is aligned in a direction perpendicular to an optical axis of the communication light at the connection portions,
    wherein the communication light detection portion cases adjacent to each other are spaced apart from each other in an alignment direction thereof.

3. The communication light detection device according to claim 2, wherein the communication light detection portion cases adjacent to each other are spaced apart from each other with a gap therebetween.

4. The communication light detection device according to claim 2, wherein the communication light detection portion cases adjacent to each other are spaced apart from each other with a translucent member translucent to the communication light therebetween.

5. The communication light detection device according to claim 1, wherein the communication light detection portions adjacent to each other are arranged so that the positions of the light leak portions are shifted in a length direction parallel to the optical axis of the communication light at the connection portions,
    wherein the cases for the communication light detection portions include a main body portion in which the connection portions are accommodated, and an extension portion extended in the length direction from the main body portion for accommodating either one of the first optical fiber and the second optical fiber,
    wherein the extended portions are formed narrower in width than the main body portions and are extended longer than length direction positions of the light leak portions of the communication light detection portions adjacent to each other.

6. The communication light detection device according to claim 5, wherein the light leak portion of each of the communication light detection portions is alternately arranged at a first length direction position and a second length direction position so that the lengthwise positions of the light leak portions are different in the communication light detection portions adjacent to each other.

7. The communication light detection device according to claim 5, wherein the extended portions are formed with a locking protrusion on both side surfaces thereof, while the main body portions are formed with a locking groove on both side surfaces thereof to lock the locking protrusions,
wherein the communication light detection portion cases adjacent to each other are arranged in opposite directions in the length direction and are fixed to each other by locking one of the locking protrusions to another of the locking grooves and an other one of the locking protrusions to one of the locking grooves, respectively.

8. The communication light detection device according to claim 7, wherein the main body portions and the extended portions are integrally formed,
wherein the recessed grooves are formed across the main body portions and the extended portions,
wherein the locking protrusions and the locking grooves are formed so that when the communication light detection portion cases adjacent to each other are fixed to each other, the side surfaces of the communication light detection portion cases adjacent to each other are spaced from each other with a gap therebetween.

9. The communication light detection device according to claim 5, wherein the extended portions are formed of a tube that covers an outer circumference of the first optical fiber or the second optical fiber extended from the main body portions and that does not transmit the leak light.

10. The communication light detection device according to claim 1, wherein the recessed grooves are provided with a reflective material for reflecting the leaked light on an inner peripheral surface thereof.

11. The communication light detection device according to claim 1, including a light shielding wall that is provided on the circuit board or the cases for the communication light detection portions and that shields the leak light, thereby suppressing the leakage of the leak light to the communication light detection portions adjacent to each other.

12. A communication light detection device, comprising:
a housing provided with a plurality of first optical adapters and a plurality of second optical adapters; and
a plurality of communication light detection portions provided in connection portions respectively for optically connecting together a first optical fiber provided in the housing and extended from the first optical adapters into the housing and a second optical fiber extended from the corresponding second optical adapters into the housing, to detect communication light transmitted via both the optical fibers,
wherein each of the communication light detection portions includes a respective light leak portion provided in the connection portions to allow a part of the communication light to leak, a respective light receiving element to detect the leak light leaked at the light leak portion, and a respective case for the communication light detection portions disposed on a bottom wall of the housing and including a recessed groove for accommodating the connection portions and not transmitting the leak light,
wherein a circuit board is included with the plurality of the light receiving elements mounted thereon together, and is provided, thereby closing the openings of the recessed grooves of the plurality of the communication light detection portion cases together,
wherein an elastic sheet is provided between each of the communication light detection portion cases and the bottom wall of the housing or between each of the communication light detection portion cases and the circuit board, and when the circuit board is pressed toward a bottom wall side of the housing, the elastic sheet is elastically deformed by that pressing.

13. The communication light detection device according to claim 12, wherein the elastic sheet is a rubber sheet made of a rubber material.

14. The communication light detection device according to claim 13, wherein the thickness of the elastic sheet is 0.2 mm or more and 1.0 mm or less.

15. The communication light detection device according to claim 12, wherein the elastic sheet is provided between each of the communication light detection portion cases and the circuit board,
wherein the elastic sheet is formed with a plurality of light receiving element holes penetrating the elastic sheet in a thickness direction to avoid the light receiving elements.

16. The communication light detection device according to claim 12, wherein the communication light detection portion cases are aligned in a direction perpendicular to an optical axis of the communication light at the connection portions,
wherein the communication light detection portion cases adjacent to each other are spaced apart from each other in an alignment direction thereof.

* * * * *